(12) United States Patent
Geigel

(10) Patent No.: US 11,587,007 B2
(45) Date of Patent: Feb. 21, 2023

(54) SYSTEM AND METHOD FOR AUTOMATIC LEARNING AND SELECTING OF A CANDIDATE WORKFLOW REPRESENTATIVE OF MACHINE LEARNING FLOW SET

(71) Applicant: Atlantic Technical Organization, San Juan, PR (US)

(72) Inventor: Arturo Geigel, San Juan, PR (US)

(*) Notice: Subject to any disclaimer, the term of this patent is extended or adjusted under 35 U.S.C. 154(b) by 73 days.

(21) Appl. No.: 17/122,305

(22) Filed: Dec. 15, 2020

(65) Prior Publication Data

US 2022/0188714 A1 Jun. 16, 2022

(51) Int. Cl.
*G06Q 10/06* (2012.01)
*G06N 20/00* (2019.01)
*G06Q 10/0633* (2023.01)

(52) U.S. Cl.
CPC ......... *G06Q 10/0633* (2013.01); *G06N 20/00* (2019.01)

(58) Field of Classification Search
CPC ... G06N 20/00; G06Q 10/06316; G06Q 10/06
See application file for complete search history.

(56) References Cited

U.S. PATENT DOCUMENTS

| | | | |
|---|---|---|---|
| 606,613 A | 6/1898 | Willis | |
| 895,850 A | 8/1908 | Gerstenhauer | |
| 6,606,613 B1* | 8/2003 | Altschuler | G06Q 10/10 707/999.006 |
| 8,954,850 B2* | 2/2015 | Gschwind | G06Q 10/10 715/764 |
| 10,949,259 B2* | 3/2021 | Geigel | G06F 9/5044 |
| 11,221,831 B1* | 1/2022 | Al Khafaji | G06F 9/451 |
| 11,269,911 B1* | 3/2022 | Jones | G06F 16/254 |
| 2014/0067804 A1* | 3/2014 | Yoshizawa | G06F 16/284 707/736 |
| 2014/0297354 A1* | 10/2014 | Kogiso | G06F 9/46 705/7.26 |
| 2016/0358102 A1* | 12/2016 | Bowers | G06N 20/00 |
| 2016/0358103 A1* | 12/2016 | Bowers | G06F 9/4881 |
| 2017/0147943 A1* | 5/2017 | Boehm | G06F 8/433 |
| 2018/0165604 A1* | 6/2018 | Minkin | G06N 5/022 |
| 2018/0329740 A1* | 11/2018 | Geigel | G06F 9/5044 |
| 2019/0102700 A1* | 4/2019 | Babu | G06N 5/025 |

(Continued)

OTHER PUBLICATIONS

Shashanka M, What is a Pipeline in Machine Learning? How to create one? Analytics-Vidhya, Medium.com, Dec. 10, 2019 (Year: 2019).*

(Continued)

*Primary Examiner* — Scott L Jarrett
(74) *Attorney, Agent, or Firm* — Eugenio J. Torres-Oyola; Victor M. Rodriguez-Reyes; Ferraiuoli LLC

(57) ABSTRACT

A system and method for determining a candidate workflow from a cluster of similar workflows is presented. The process uses the differences classified as insertions of operators, deletions of operators, transpositions of operators and operator shifting in a parallel workflow to determine similarities in the workflow cluster and extract a candidate similar to the workflow in the comparison query. The extracted candidate workflow can then be used to suggest modifications to the workflow in the comparison query.

18 Claims, 16 Drawing Sheets

(56) References Cited

U.S. PATENT DOCUMENTS

| | | | | |
|---|---|---|---|---|
| 2019/0138314 | A1* | 5/2019 | Geigel | G06F 9/5044 |
| 2019/0378052 | A1* | 12/2019 | Badhwar | G06N 20/00 |
| 2020/0082273 | A1* | 3/2020 | Rossi | G06F 9/5038 |
| 2020/0184376 | A1* | 6/2020 | Parameswaran | G06N 5/003 |
| 2020/0242510 | A1* | 7/2020 | Duesterwald | G06N 5/003 |
| 2020/0272909 | A1* | 8/2020 | Parmentier | G06N 20/00 |
| 2021/0182729 | A1* | 6/2021 | George | G06F 9/5044 |
| 2021/0241152 | A1* | 8/2021 | Fong | G06N 20/00 |
| 2021/0326736 | A1* | 10/2021 | Kishimoto | G06K 9/6227 |
| 2021/0334693 | A1* | 10/2021 | Bavly | G06N 5/04 |
| 2021/0342490 | A1* | 11/2021 | Briancon | G06F 21/75 |
| 2022/0004954 | A1* | 1/2022 | Rafferty | G06F 40/216 |
| 2022/0083881 | A1* | 3/2022 | Chaudhary | G06N 20/00 |
| 2022/0092471 | A1* | 3/2022 | Jaeger | G06N 20/20 |
| 2022/0114486 | A1* | 4/2022 | Zhou | G06K 9/6267 |
| 2022/0121988 | A1* | 4/2022 | Margineantu | G06N 20/00 |
| 2022/0180243 | A1* | 6/2022 | Geigel | G06F 17/16 |
| 2022/0180245 | A1* | 6/2022 | Geigel | G06N 20/00 |
| 2022/0198298 | A1* | 6/2022 | Chow | G06Q 10/10 |
| 2022/0207287 | A1* | 6/2022 | Geigel | G06K 9/6224 |

OTHER PUBLICATIONS

Dong, Tony, An An Omni-ensemble Automated Machine Learning—OptimalFlow TowardsDataScience.com, Aug. 13, 2020 (Year: 2020).*
Weber, Ben, Workflow Tools for ML Pipelines TowardsDataScience.com, Nov. 10, 2019 (Year: 2019).*

\* cited by examiner

| Operator | Operator ID | Operation | Operation ID |
|---|---|---|---|
|  DB-1 | 2 | Database connector | 1 |
|  JOIN-7 | 5 | Join Data Paths | 2 |
|  SPLIT-8 | 4 | Split Data Paths | 3 |
|  Classifier-2 | 1 | Supervised Learning Operation | 4 |
|  Cluster-12 | 1 | Clustering Operation | 5 |
|  SORT ROW... | 1 | Sort Rows Operation | 6 |
|  UPLDADA-4 | 1 | Database connector to save Data | 7 |

SYSTEM AND METHOD FOR AUTOMATIC LEARNING AND SELECTING OF A CANDIDATE WORKFLOW REPRESENTATIVE OF MACHINE LEARNING FLOW SET

BACKGROUND OF THE INVENTION

Field of the Invention

The present disclosure is directed to a system and method for providing assistance to complete machine learning on workflow engines that deal with and machine learning flows.

Discussion of the Background

Current trends in machine learning are advancing at a rapid pace. As they become mainstream, machine learning implementations will shift focus from single module implementations or two to three modules to a complex web where dozens of machine learning algorithms alongside ETL operations are carried out. The complexity of this web on which multiple machine learning algorithms interact will strain the cognitive limitations of their creators. Some of these issues are already is being documented in other similar scenarios such as the one in *Lost in transportation: Information measures and cognitive limits in multilayer navigation*, by Riccardo Gallotti, Mason A. Porter, and Marc Barthelemy.

The present disclosure is directed at identifying commonalities in multiple machine learning flows by clustering similar flows based on an inclusion/exclusion criterion through properly encoding criteria of the required elements of processing a machine learning workflow.

This process is the first step in a more complex process of getting a machine learning algorithm to learn machine learning flows. Clustering machine learning flows helps in isolating commonalities that machine learning algorithms can use for learning the necessary patterns to construct similar machine learning workflows.

DESCRIPTION AND SHORTCOMINGS OF THE PRIOR ART

While application platforms can offer some level of abstraction by providing graphical user interfaces, hiding the complexity of programming languages, there is still a cognitive overload possibility due to complex workflows that can be developed to manage complex data processing tasks.

U.S. Pat. No. 6,606,613 (the "'613 patent") B1 describes task models to help users complete tasks. This prior art has several shortcomings which are outlined as follows. First, the '613 patent models a single user's tasks whereas the present disclosure aims at parallel processes of tasks which present a different solving paradigm. Second, the clustering used in the '613 patent of similar tasks is based on agglomerative hierarchical clustering and this works for segregating tasks based on intersections and the difference between graphs.

The problem that the present disclosure aims to solve is how to cluster the machine learning workflows not on merely graph properties but also properties of the workflow itself. Properties such as the type of operation and its adjacent operators play a crucial role in establishing a processing pipeline that describes segments of the workflow. The properties that are crucial for proper segregation of the workflows require that each segment of the workflow be described by the operation being done, the algorithm used, the type of data being processed, and the underlying processing infrastructure in a parallel environment. Each of these properties can be further broken down according to processing speed, algorithm complexity, particular operation optimization, etc. These elements are essential in describing each node of processing in a parallel environment which are separate from the graph itself. Further, the graph itself is not a useful concept in parallel operation due to timing issue that might make a difference in processing. Such shortcomings are overcome in the present disclosure by embedding the graph in a coordinate system which can be fitted according to the requirements of comparison.

U.S. Pat. No. 8,954,850 (the "'850 patent") uses agglomerative clustering to assist the user in building a workflow. The objective of this prior art is to detect similar patterns of construction of a flow in terms of the nodes under each branch of the business process. The limitation of this approach is that objects classified within a branch are not treated as sequentially dependent. Such data is indispensable to describe time dependent and operation dependent flows.

Providing appropriate contextual information beyond the graph structure is essential to any accurate matching of workflows, which the prior art does not provide. Contextual information that is not present in the prior art that can be used as properties of the workflow are their appropriate position with regards to other elements, where they are going to be executed, whether multiple flows share the same sequential information and in what order and patterns of multiple operators in a sequence. Discriminating among sequences into different branches of the clusters is also not present in the prior art. All these shortcomings limit the prior art on the degree of accuracy of the automation that can be produced by such methods.

DETAILED DESCRIPTION OF THE PREFERRED EMBODIMENTS

Figure 1:
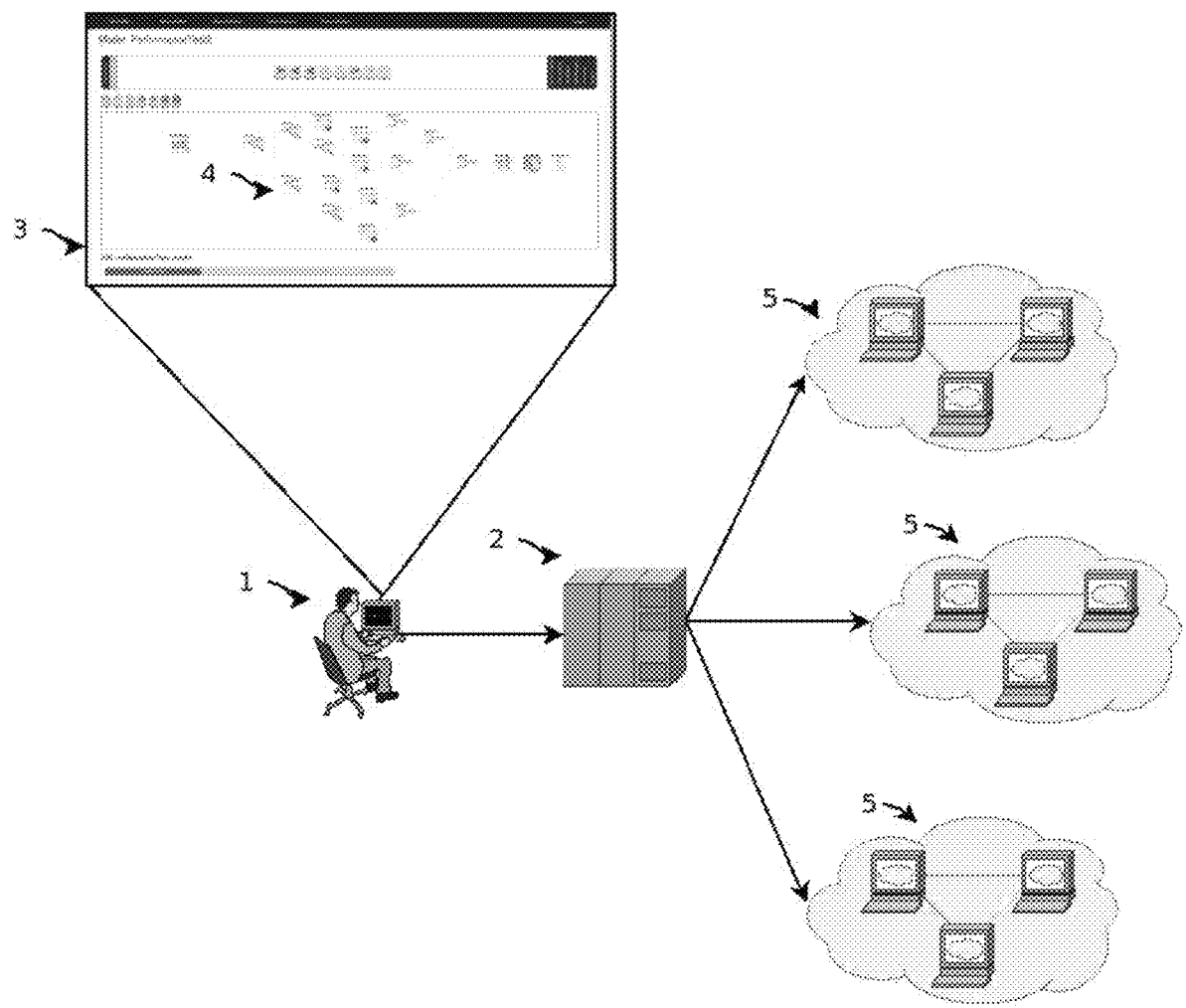
FIG. 1 shows a typical embodiment of a system that performs the functions of making machine learning workflows according to the teachings of the present invention.

FIG. 1 Shows a typical embodiment of a system that performs the functions of making machine learning workflows. The system is accessed by a user through a terminal 1. The terminal 1 is connected to a central processing system 2 that contains memory components and processing units. The terminal accesses the functionality of the of the central processing system via an interface system 3 that has functionality icon 4. The central processing system 2 will process the information given by the interface system 3 and a functionality icon 4 to the terminal systems CPU and memory system or to a distributed architecture 5.

Figure 2:
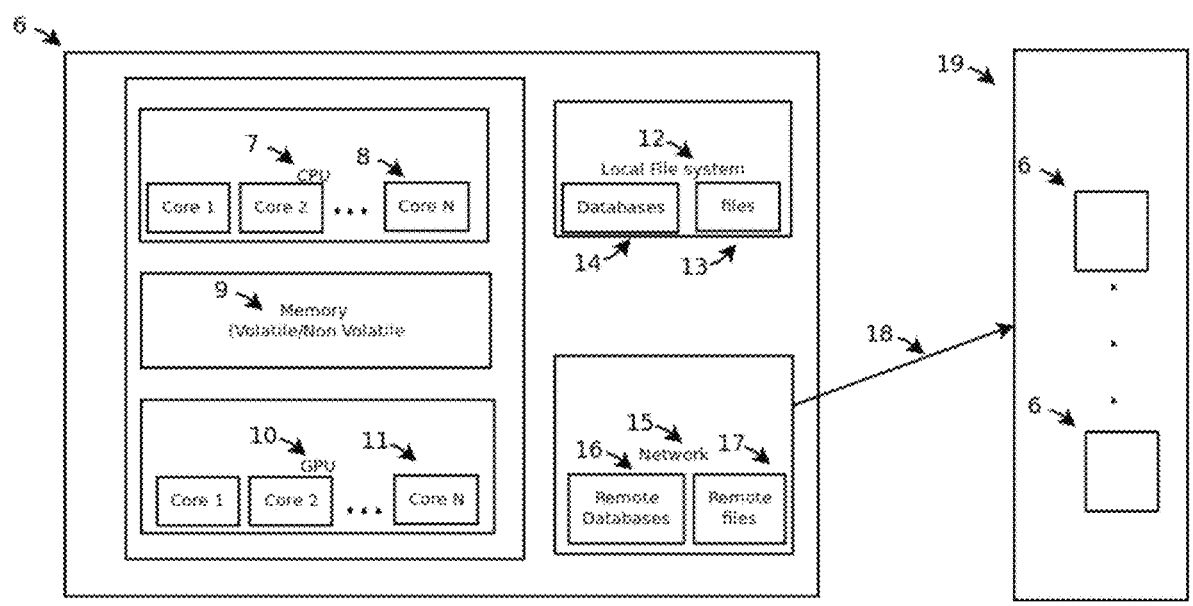
FIG. 2 describes the physical layout of the typical execution environment on which the parallel execution will take place according to the teachings of the present invention.

FIG. 2 describes an example of the physical layout of the typical execution environment on which the parallel execution takes place. A typical embodiment consists of a computer system 6 that contains a CPU 7 with a number of N cores 8. The N cores 8 are capable of doing multi-threading tasks on the CPU 7. The computer system 6 also contains a memory system capable of storing information for processing by the CPU 7. The computer system 6 can also contain a compute capable GPU 10 with a number of N cores 11. Computer system 6 has a local file system 12 that can contain several files 13 and possibly a database system 14. Computer system 6 includes a network interface 15 that can access a remote database system 16 or a remote file system 17. Access to remote database system 16 and/or a remote file system 17 is done through a network card in network 15 via a connection 18 to a cloud infrastructure 19. The cloud infrastructure 19 contains up to n computer systems 6.

Figure 3:
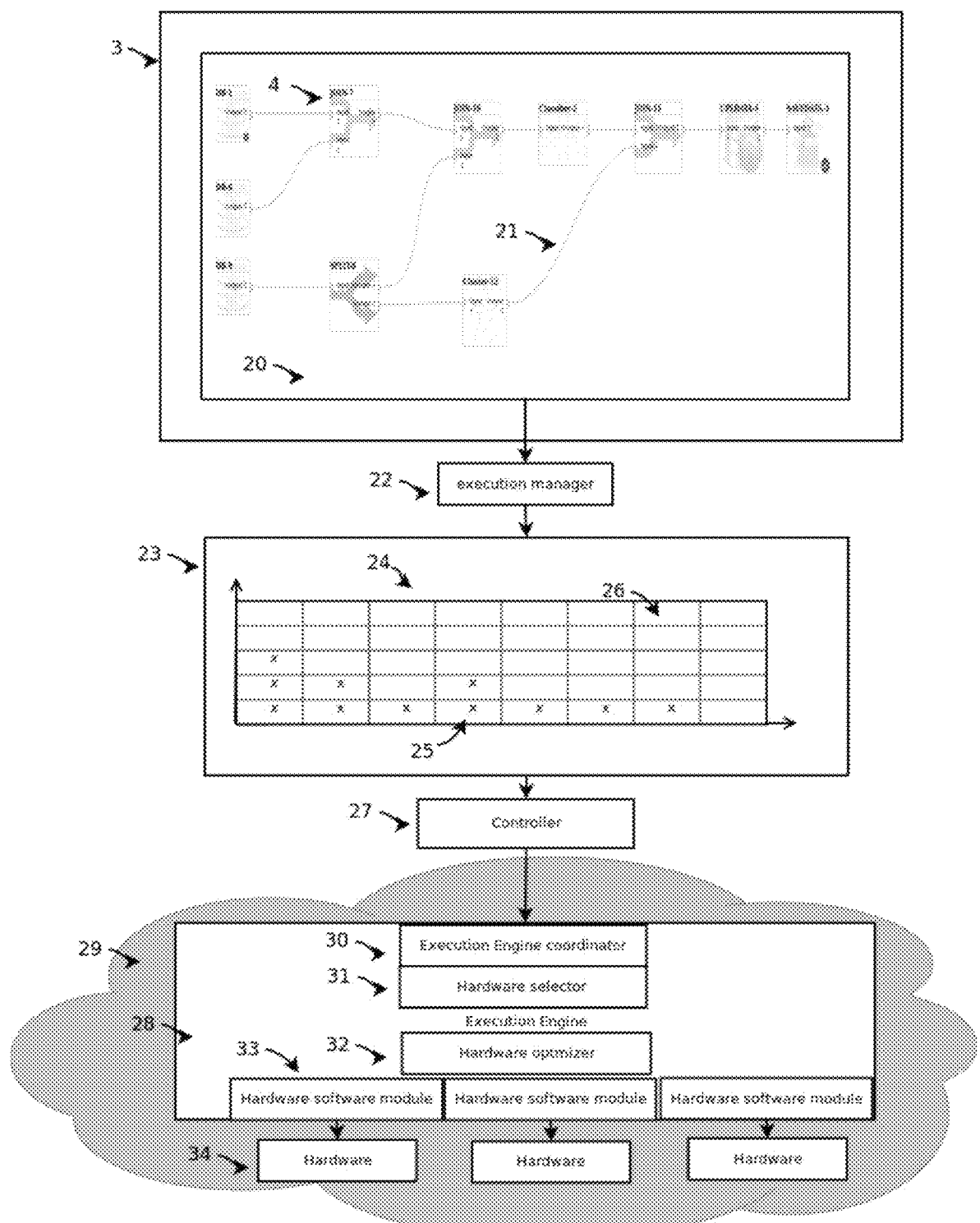
FIG. 3 displays a graphical representation of the major components of an exemplary system that can perform the functions of making machine learning workflows according to the teachings of the present invention.

FIG. 3 Displays a graphical representation of the major components of an exemplary system that can perform the functions for making machine learning workflows. The system starts with the interface system 3 that has functionality icon 4, which contains the configuration that the system will execute. An execution program 20 is specified by the functionality icon 4 connected via a link 21. Once the execution program 20 is finished the program will be forwarded to an execution manager 22. The execution manager 22 will reside on the central processing system 2 which is a typical computer system 6. The execution manager will produce an execution map 23 based on the execution program 20. The execution map 23 contains an execution matrix 24 that will store the order of the execution. Each entry in the execution matrix 24 is assigned an execution slot 25 that can be filled with an execution entry 26 that corresponds to functionality icon 4. Once the execution map 23 is completed it is passed to a controller 27 that also resides central processing system 2. The controller coordinates the execution with an execution engine 28 across the cloud environment 29. Cloud environment 29 is composed of cloud infrastructure 19 that contains up to n computer systems 6. The controller 27 communicates to an execution engine coordinator 30 that resides on one of n computer systems 6 of cloud environment 29. The execution engine coordinator 30 uses a hardware selector 31 to discriminate which component of computer systems 6 should be used. For example, hardware selector 31 can choose between execution between the N cores 8 on the CPU 7 or use GPU 10 or other processing technology. Once hardware selector 31 chooses the particular processing technology, the hardware selector 31 selects a hardware optimizer 32 which coordinates with a hardware software module 33 that contains the necessary routines to interact with hardware 34.

Figure 4:
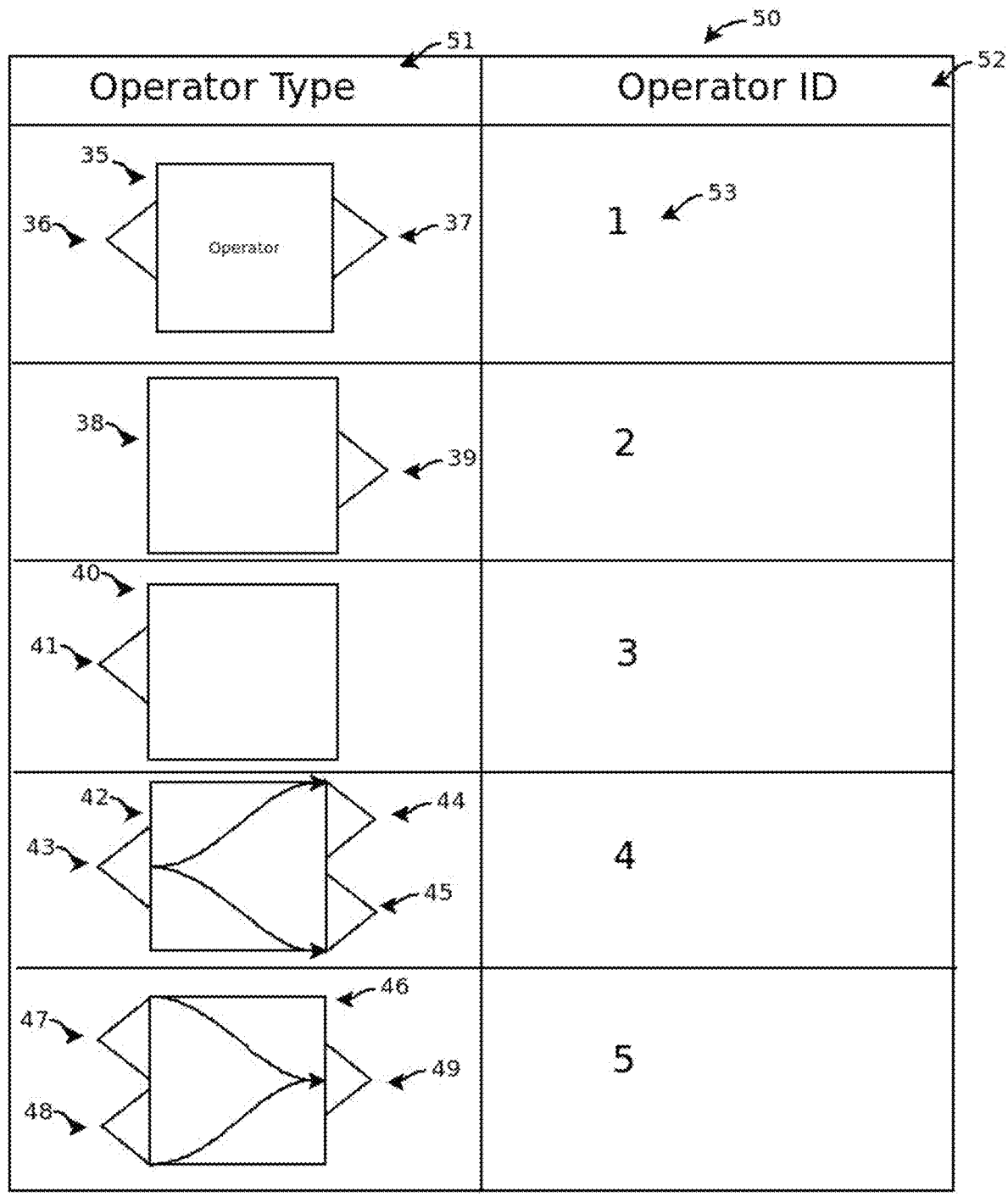
FIG. 4 shows the categories of graphical operator elements according to the teachings of the present invention.

FIG. 4 shows the categories of graphical operator elements. Functionality icon 4 of interface system 3 can be divided into several icon types with specific functions that are independent of the particularity of the operations they are required to perform. FIG. 4 shows an operator 35 that has an input link connector 36 and an output link connector 37. The operator 35 represents an operation that has one input and one output. For example, this may represent a single instruction single datum (SISD) or single instruction multiple data operation (SIMD). An operator 38 contains an output link connector 39 representing a source operation. A source operation can be usually be taken but not limited to data extraction from a source that can be a database, file, web service, or other similar operation that does not accept an input to the operator. An operator 40 contains an input link connector 41 representing a destination operation. A destination operation can be usually be taken but not limited to data storage such as insertion to a database, file, web service or other operation that only accepts an input to the operator. An operator 42 represents a split operation. The operator 42 has an input link connector 43 that represents the input to the system. The operator 42 also contains an output link connector 44 and an output link connector 45. The split operation done by operator 42 takes one input through input link connector 43 and performs a split of the data into separate streams that are redirected to output link connector 44 and output link connector 45. Finally, an operator 46 represents a join operation. The operator 46 has an input link connector 47 and an input link connector 48. The operator 46 also contains an output link connector 49. The join operation carried out by operator 46 takes two data streams through input link connector 47 and input link connector 48 and joining the data stream into a single output that is sent to output link connector 49. The type of joining of data of operator 42 and splitting of data by operator 46 is independent of the operator type. A database table 50 can store the categories represented in operators 35, 38, 40, 42, 46 in a column 51 and have an operator ID column 52 storing an ID 53 that will be used to identify particular implementations of operators 35, 38, 40, 42, 46.

Figure 5:
FIG. 5 shows a database table of a particular implementation of operator types alongside identifying fields according to the teachings of the present invention.
Figure 5:
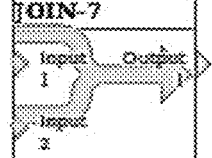
Figure 5:
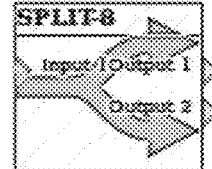
Figure 5:
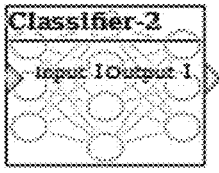
Figure 5:
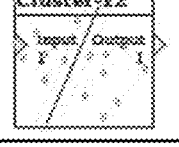
Figure 5:
Figure 5:

FIG. 5 shows a database table of an exemplary implementation of operator types alongside identifying fields. A database table 54 holds an operator field 55 that holds an operator 56. The operator 56 is given its diagrammatic form via functionality icon 4. The operator 56 is described by an operation field 57 that provides a description of what the operator does. The operator 56 is associated via database table 64 to operator ID column 52 of database table 50 via an operation ID field 58 thereby linking a particular operator with its type.

Figure 6:
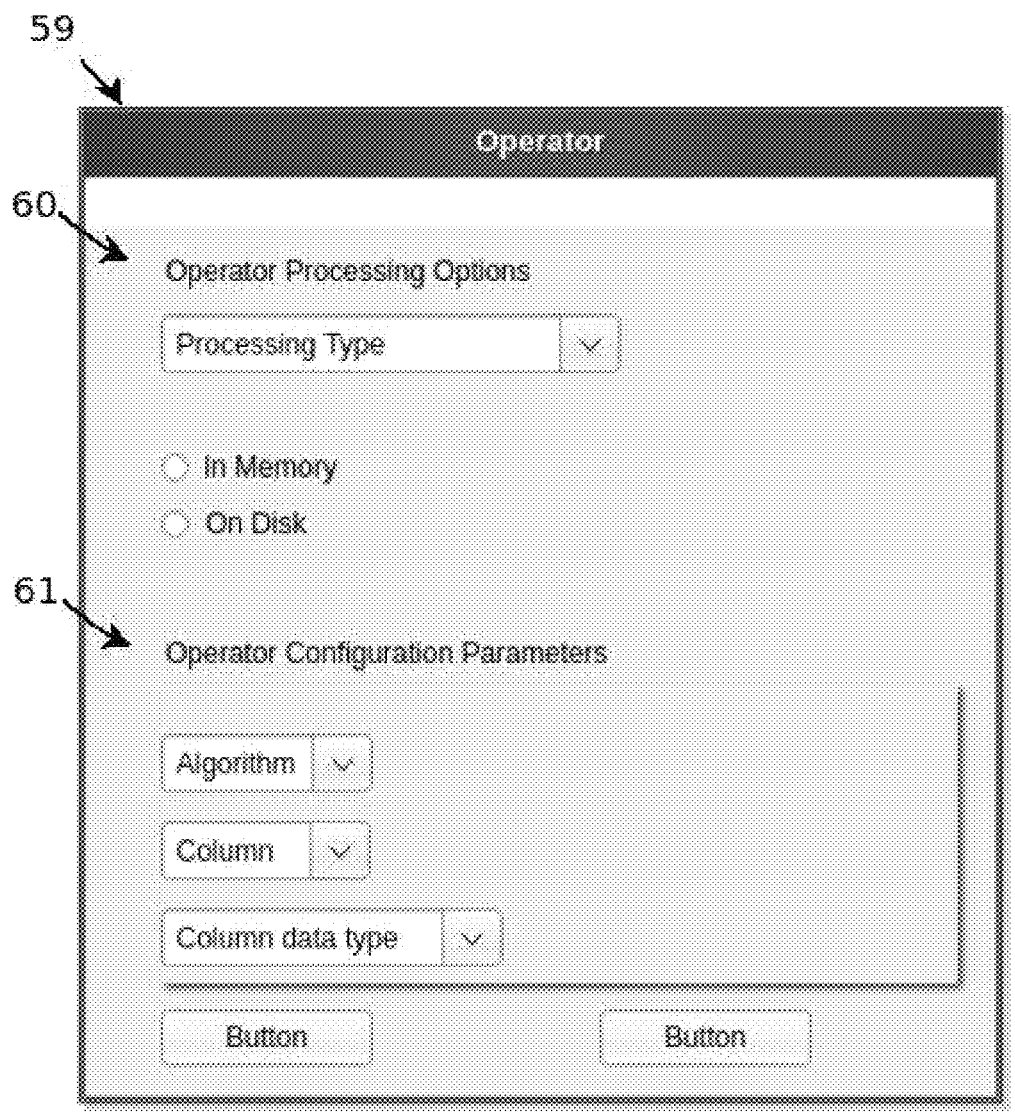
FIG. 6 shows an example of general fields that make up the configuration parameters of an operator according to the teachings of the present invention.

FIG. 6 shows an example of general fields that make up the configuration parameters of an operator. The operator 56 accessed on interface system 3 via functionality icon 4 which will then present a configuration window 59. The configuration window can have multiple configuration parameters. Such parameters can be divided into an operator processing options 60 and operator configuration parameters 61. Operator processing options 60 depend on the particular hardware options of terminal 1, the central processing system 2 and distributed architecture 5. Operator processing options 60 depend on the type of process or algorithm implemented and the data characteristics on which the operator will act upon.

Figure 7:
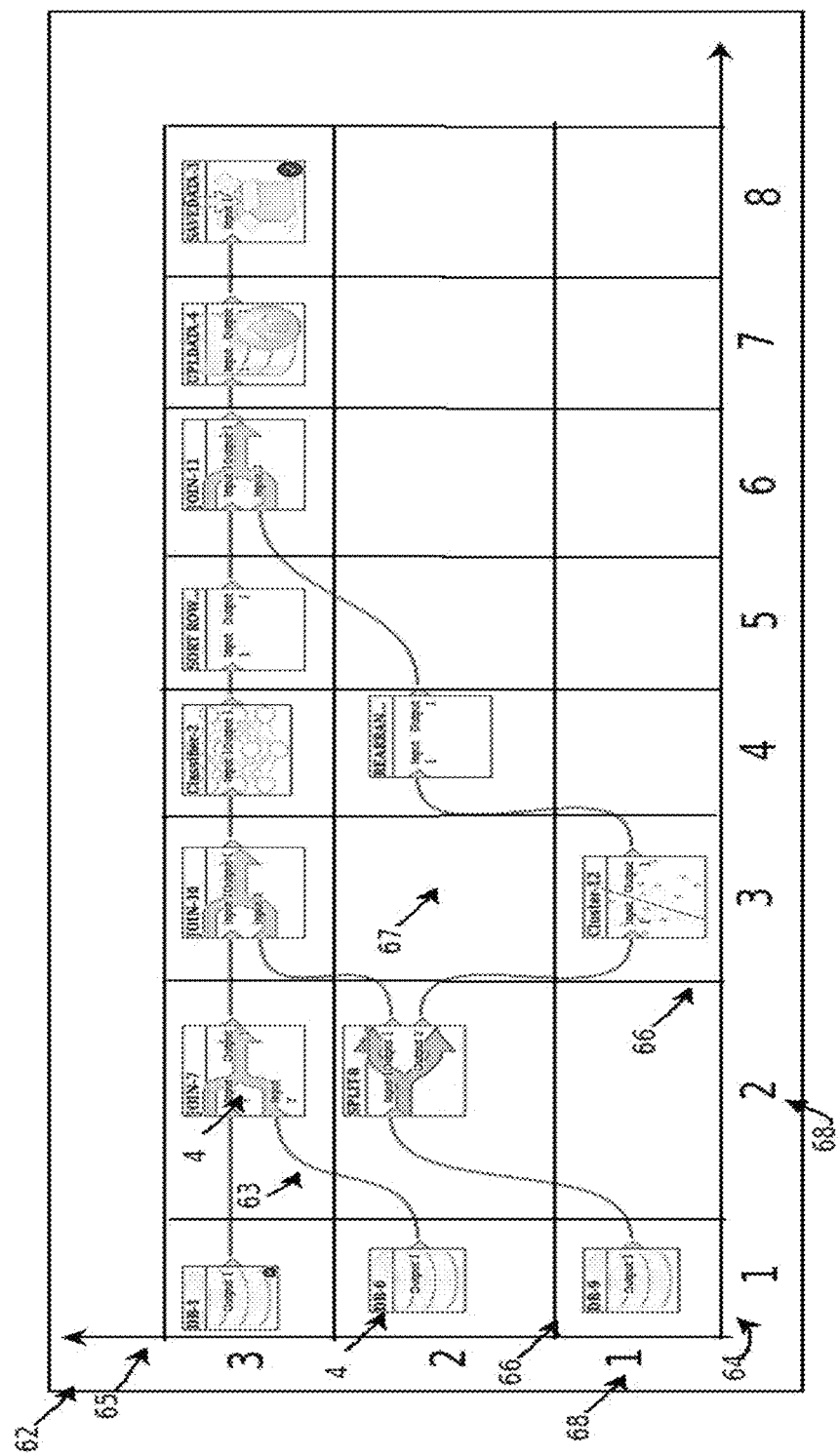
FIG. 7 Shows an execution map representative of a machine learning workflow divided into a grid where operators can be identified within a particular workflow according to the teachings of the present invention.

FIG. 7 shows an execution map representative of a machine learning workflow divided into a grid where operators can be identified within a particular workflow. A machine learning workflow 62 is representative of a typical machine learning flow. The flow is composed of functionality icons 4 which are joined by a workflow line 63. The machine learning workflow 62 can be put into a context of a grid by adding an x-grid line 64 and an y-grid line 65. The x-grid line 64 and the y-grid line 65 can each be divided by a line segments 66 that make up a square segment 67. Each segment 67 can then be identified by a number 68 on the x-grid line 64 and an y-grid line 65. The square segment 67 can be empty or populated by functionality icons 4. The functionality icon that is mapped to an operator 56 can give each square segment 67 a maximum number of line segments 66 depending on the description on database table 50 of operator 56. This particular implementation makes validation of the flow deterministic in nature.

Figure 8:
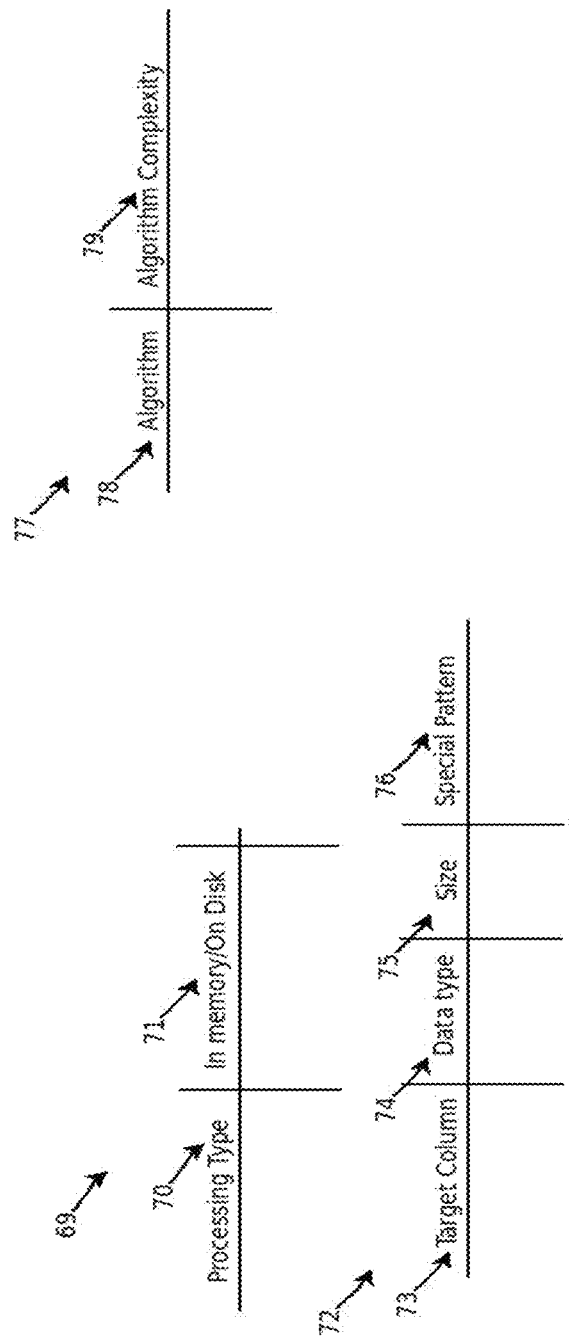
FIG. 8 shows a table representation of descriptive fields of the operators according to the teachings of the present invention.

FIG. 8 shows a table representation of descriptive fields of the operators. A database table 69 shows properties of the operator 56 configuration that is done in configuration window 59 of FIG. 6. Database table 69 contains fields that belong to the particular hardware configuration parameters of the operator 56 such as a processing type field 70 that indicates whether it is single processor, multi core execution, GPU, etc., and a field 71 for in memory/on disk execution type. A database table 72 contains data parameters on which the operator 56 will execute on. A database table 72 contains attributes that belong to the data on which the operator 56 has been implemented on. The table 72 contains a column 73 which contains the target column of a file that has a vector format where each column belongs to a vector component. Table 72 also contains a column 74 that specifies the data type of the target data column identified in column 73. Column 73 can be represented as the column name, its position on the file, its identification number or a combination of fields or a composite of fields. Table 72 also contains a column 75 for the size of the data field. The size of the field can be interpreted as the number of characters of a string or the precision of a double precision number. The table 72 also contains a column 76 that holds particular patterns of the data such as those encoded by a regular expression or other such specification. A database table 77 contains information pertaining to the algorithm used in operator 56. The database table 77 contains information encoded in columns such as a table column 78 for the particular algorithm and a database table column 79 that specified the algorithm complexity of the particular algorithm implemented. This fields are not to be construed as the only fields to be included in database tables 69, 72 and 77 but as representative examples of each category of each respective table and the information to be stored in them.

Figure 9:
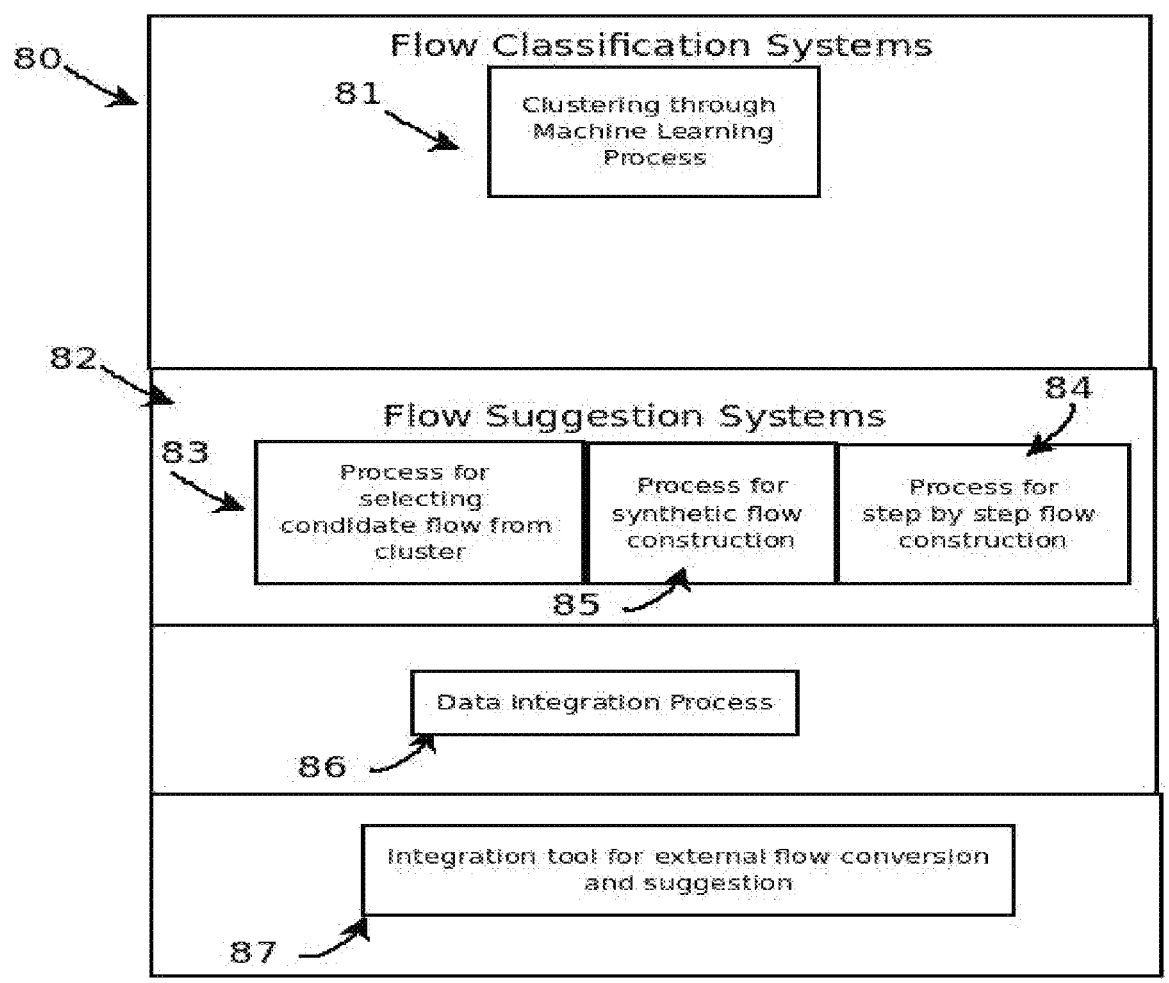
FIG. 9 describes the different components that make up a suggestion system according to the teachings of the present invention.

FIG. 9 describes the different components that make a suggestion system for classifying machine learning flows. A flow classification system 80 contains a subsystem 81 that implements clustering through machine learning processes. The flow classification process 80 also includes a subsystem 82 for machine learning workflow normalization and suggestion. The subsystem 82 of normalization flow suggestion system comprises of a subsystem 83 the enables the process of selecting a candidate flow from the clusters obtained in the classification process 80, a subsystem 84 of step by step construction of the machine learning workflow, and a subsystem 85 that does a synthetic workflow construction. This synthetic workflow does not select a candidate workflow but instead builds it completely based on the information available from the workflows in the cluster. The flow suggestion system also contains a subsystem 86 that can take the selected workflow from subsystem 83, subsystem 84, and subsystem 85 and checks and adjusts its workflow components according to the available data connections. The flow suggestion system further contains subsystem 87 for translation and integration with other similar applications.

Figure 10:
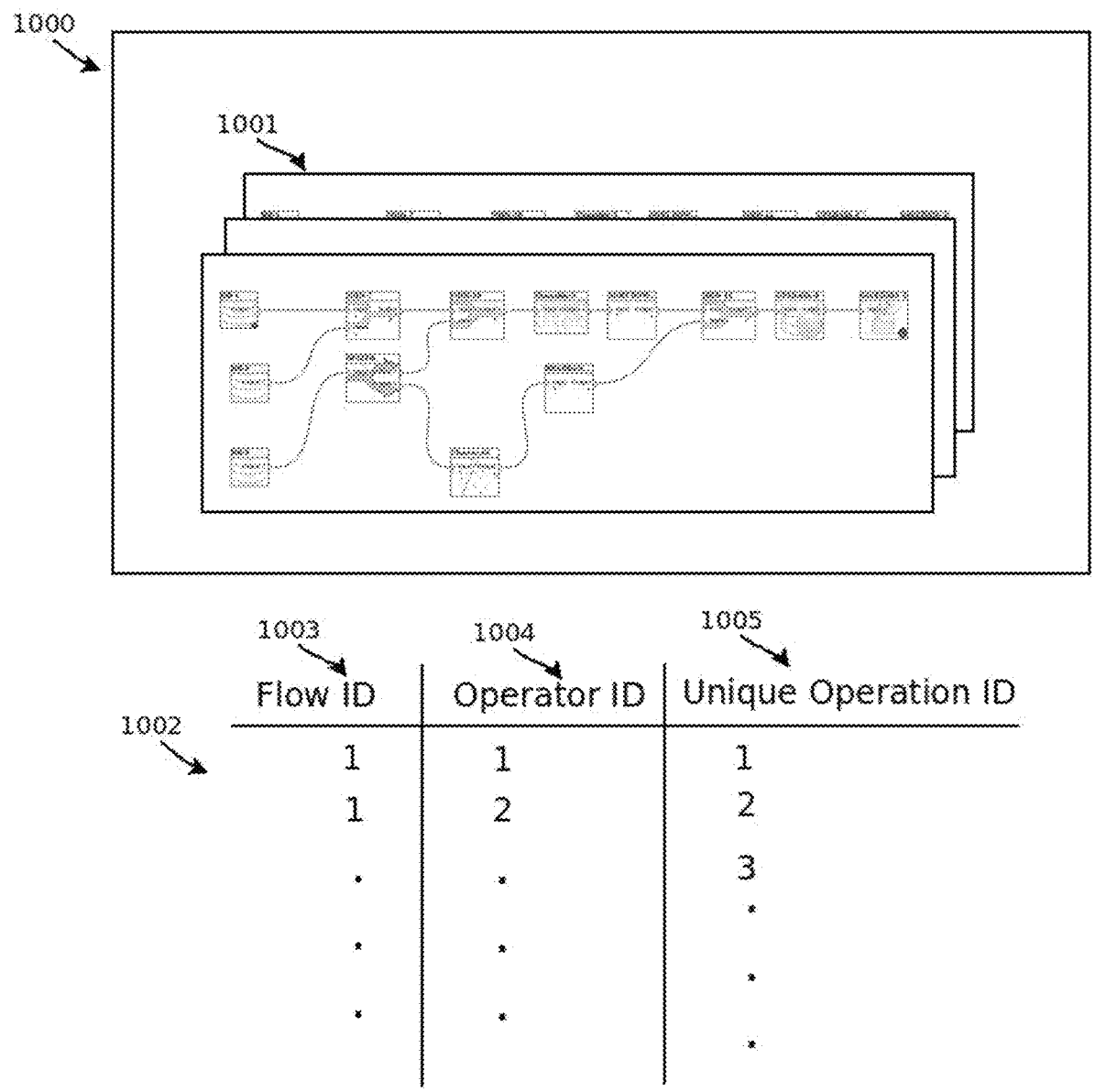
FIG. 10 shows a cluster of similar flows.

FIG. 10 shows a cluster of similar flows. A cluster 1000 contains a plurality of flows 1001 that are the result of a clustering operation. The inclusion/exclusion of flows within the plurality of flows 1001 is the result of the clustering process and in addition may have been edited by a user. A table 1002 contains a flow ID 1003 that belongs to an individual flow in the plurality of flows 1001 contained in the cluster 1000. The table 1002 also contains an operator ID 1004 that specifies the type of operation for each operator 56 within each of the flows in the plurality of flows 1001 and is associated to it through flow ID 1003. Table 1002 further contains a unique operation ID 1005 that identifies uniquely each operator 56 within plurality of flows 1001.

Figure 11:
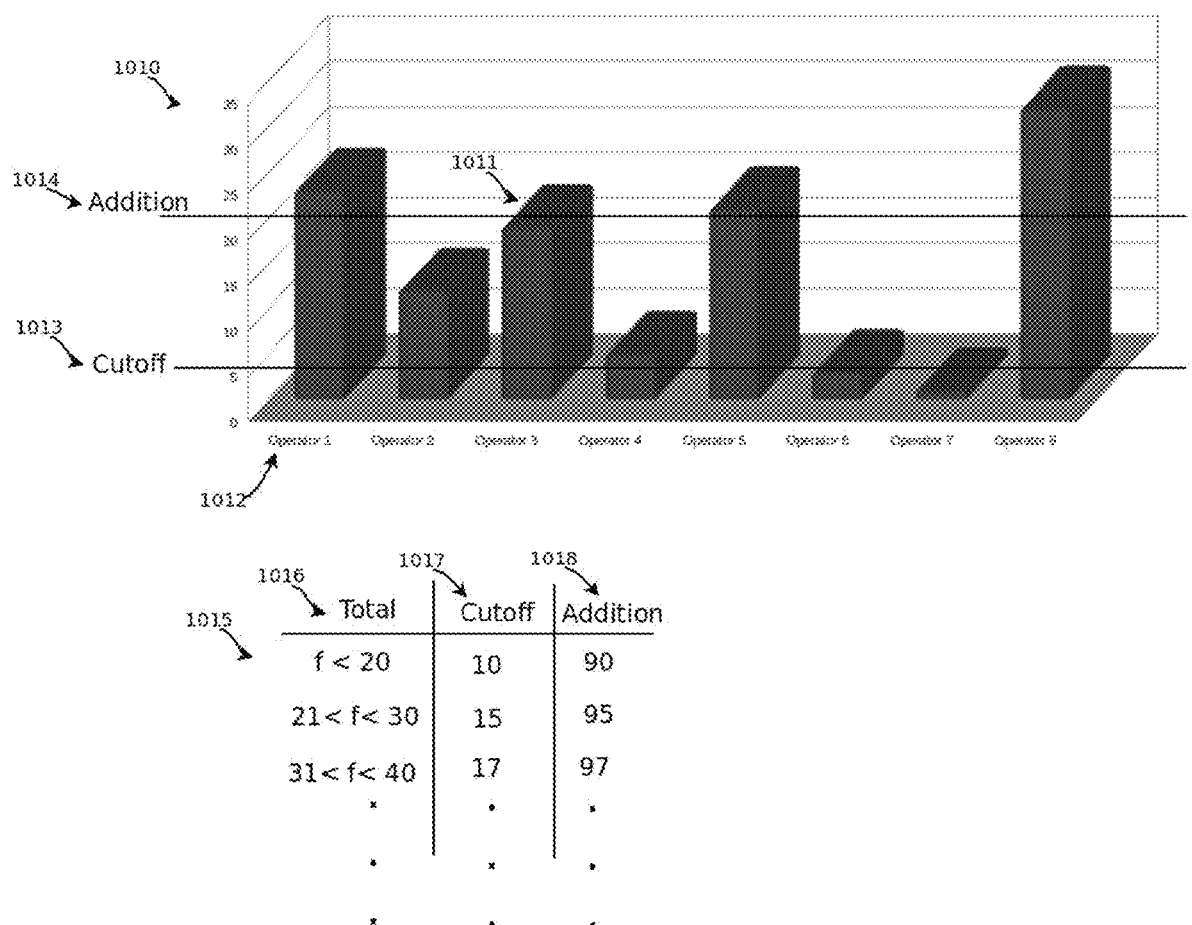
FIG. 11 shows a frequency histogram to calculate the cutoff threshold and the addition threshold.

FIG. 11 shows a frequency histogram to calculate the cutoff threshold and the addition threshold. A graph 1010 displays a plurality of bars 1011 that compose a frequency histogram. The histogram shows the graphical representation of a cutoff threshold 1013 and an addition threshold 1014 that are used to categorize deletions and insertions in a cluster of flows 1001. The graph 1010 that contains the frequency histogram is derived from table 1002 using the frequency of operator ID 1004 in this table to form plurality of bars 1011. A table 1015 is used to derive the cutoff threshold 1013 and addition threshold 1014. Table 1015 contains a column 1016 that specifies the frequency intervals for evaluation. A column 1017 establishes the cutoff threshold value for each of the intervals established in the column 1016. A column 1018 establishes the addition threshold value for each of the intervals established in the column 1016. In an alternate embodiment the column 1016 that specifies the frequency intervals for evaluation can be further detailed by the type of operator and be more granular to compensate for low frequency of occurrence flows or flows that contain few operators. In yet another embodiment, individual operators may be assigned as falling automatically in one of the three categories of above addition, below cutoff or in between addition and cutoff thresholds. In yet another embodiment a sequence of operators may be used as a single unit for evaluation.

Figure 12:
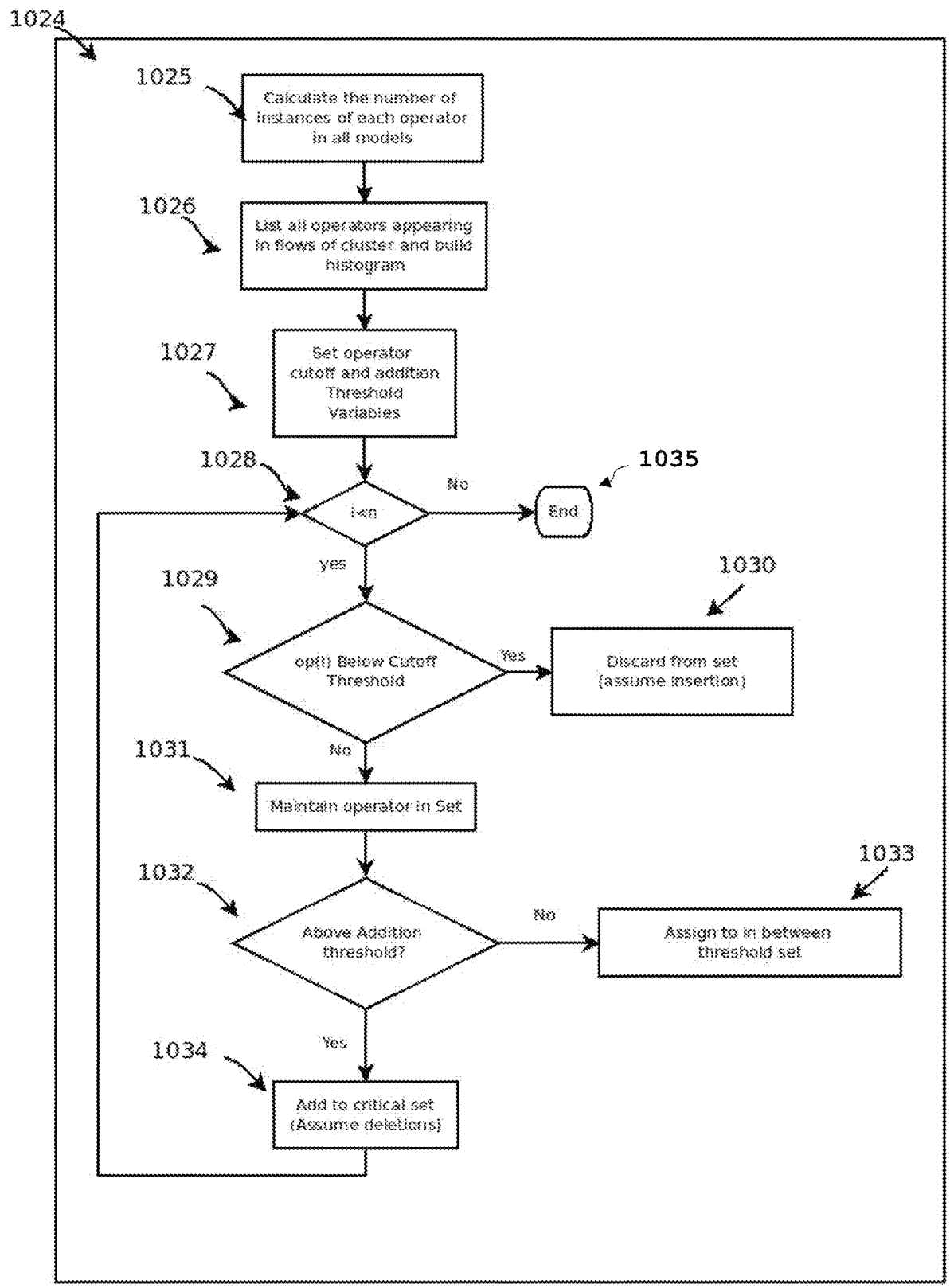
FIG. 12 presents the process of the operator frequency data to obtain the cutoff and addition threshold.

FIG. 12 presents the process of the operator frequency data to obtain the cutoff and addition threshold. A process 1024 starts with a step 1025 gets all the operators belonging to a cluster class and lists all the operators in that category. Following step 1025, a step 1026 extracts and lists all operators that appear in the flows of the selected cluster. The step 1026 further calculates the frequency of each operator as they repeat within all the flows in the cluster and builds a histogram. A step 1027 that sets the necessary variables such as the cutoff and addition threshold based on the histogram of step 1026. The process selects from the histogram the operator column that has the maximum frequency. The operator column with the maximum frequency in the histogram is then used to select the entry of table 1015 using column 1016. Additional variables may be set at this stage to assist in the completion of the process. A step 1028 carries a loop that makes the decision if the counter for the operator column of the histogram represented by i is less than the total number n of operator columns of the histogram. If the counter i is less than n then the process moves to a step 1029 where the decision of comparing the current operator column of the histogram is below the cutoff threshold value. If it is below the threshold value, then a step 1030 discards the operator column from the set. Elimination from the set assumes that an insertion was done on the flows. If the evaluation of step 1029 is negative, then the frequency of the operator is above the cutoff threshold and it is maintained in the operator set through a step 1031. Maintaining the operator column in the set implies that it is above the cutoff value that would indicate a random insertion on the flows that is not a critical component to the execution of the flows. This insertion might imply particular operations on data that were needed to convert it to what can be interpreted as a standard data set. After step 1031 a step 1032 determines if the operator column is above the addition threshold. If the addition threshold is not enough then, it is assigned by a step 1033 to an in-between provisional threshold operator set. If it falls above the addition threshold then a step 1034 assigns the operator column to a critical set. The critical set is assumed as those operators that are completely essential to the flow and its absence is so low that it is considered an accidental deletion or mistake from what is considered the standard flow representative of the cluster. A step 1035 concludes the flow when the decision of step 1028 is negative.

Figure 13:
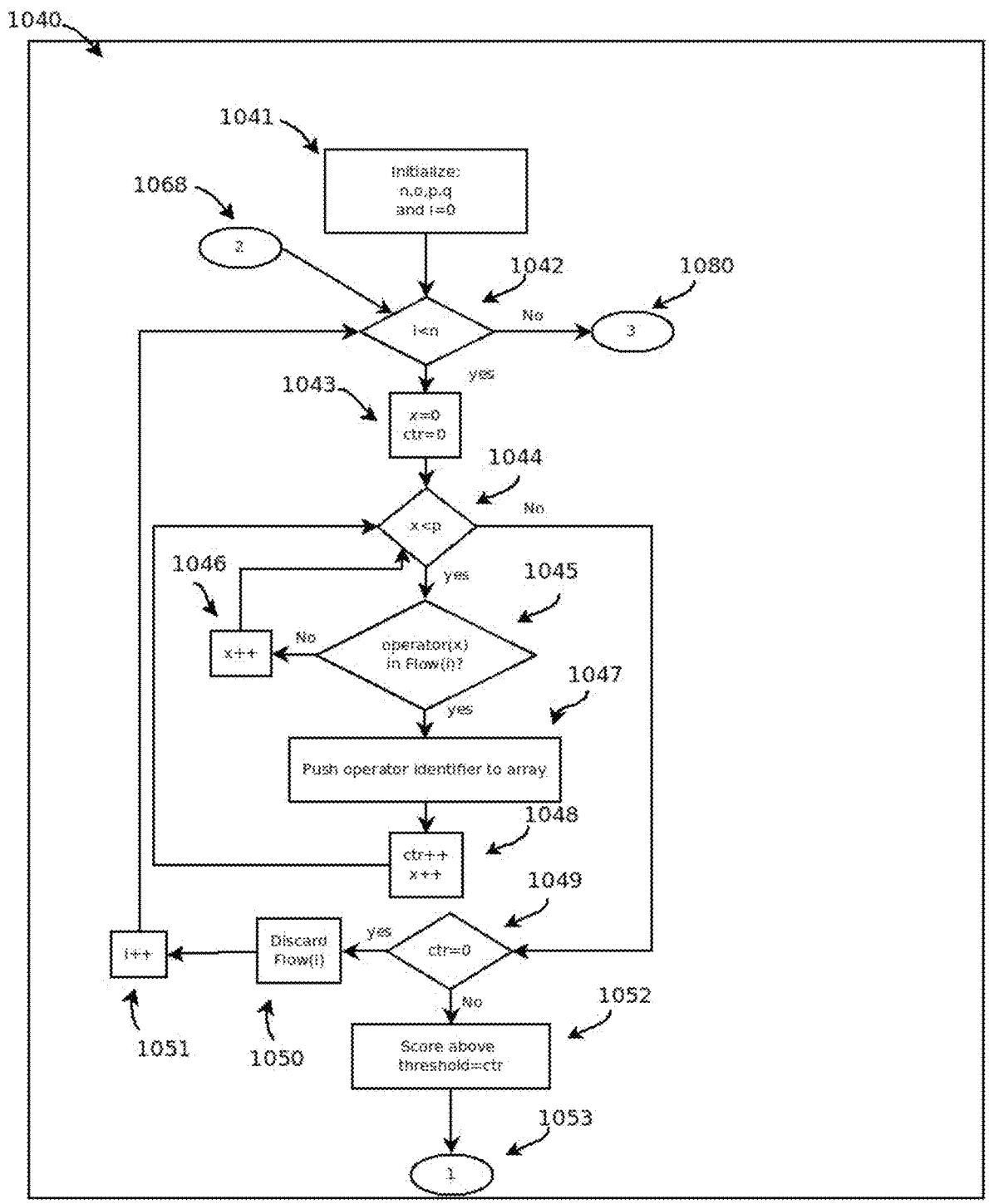
FIG. 13 presents the processing of operator above the addition threshold.

FIG. 13 presents the processing of operators above the addition threshold, which is assigned to a critical operator set. A process 1041 initializes all the necessary variables to carry out the process. A step 1042 consists of a decision process that goes through every flow in a cluster that has n members through a counter i. The comparison is used to determine when the process has iterated through every flow in the cluster. A process 1043 will initialize a variable for the current operator frequency and a counter for the addition threshold in the flow that meets the criteria of above the addition threshold. A step 1044 compares the operator frequency x to see if it is above the addition threshold. Step 1044 continues until the condition where all the operators p in the histogram of graph 1010 are evaluated. If the step 1044 is true it proceeds to a step 1045 where that operator x whose frequency is above the addition threshold belongs to the current flow. If the operator is not in the flow a step 1046 increments the counter so the next operator of the frequency histogram is evaluated. If the step 1045 is positive then, a step 1047 stores the operator in an array that holds all operators for that flow that are above the addition threshold. Step 1047 is followed by a step 1048 that increments the operator counter to evaluate the next operator and also increments the counter of the array. Additional variables can be added to the array to separate the operators per flow, therefore making the array a multidimensional array. The step 1044 evaluates to negative once all operators of the histogram are evaluated for that flow at which point the condition for step 1044 is not met and then it proceeds to a step 1049 where a counter for the array is evaluated to see if it is equal to zero. If the decision is true it means the flow does not have any operators above the addition threshold and should not be further evaluated and a step 1050 discards the flow and a step 1051 increments the flow counter to continue with the next flow. If step 1049 is false, then it implies that there are operators above the threshold in that flow and the process can continue with a step 1052. Step 1052 adds the score of the flow to a variable that stores the counter value. The variable can also be an array that uses the flow index to store the score. A continuation step 1053 points to the next steps in the process.

Figure 14:
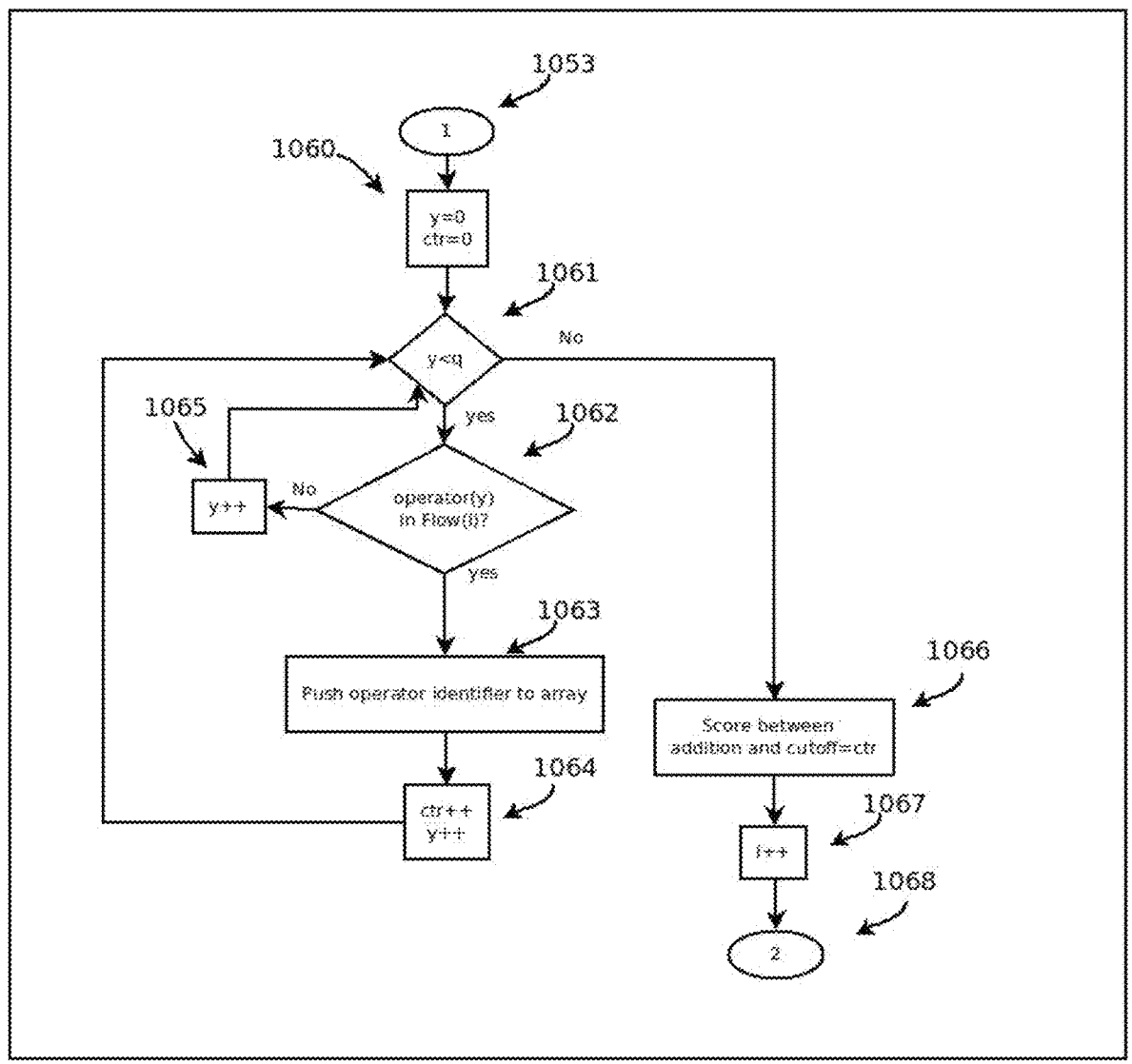
FIG. 14 presents the processing of operators between the addition and cutoff threshold.

FIG. 14 presents the processing of an operator between the addition and cutoff threshold, which is assigned to a provisional operator set. Continuation step 1053 is followed by a step 1060 that initializes the variables needed for the next step of processing. Step 1061 uses the variables of step 1060 and determines if the operator y is above the cutoff threshold and below the addition threshold. If it is positive, then a step 1062 checks to see if the operator y is in the current flow being analyzed. If it is positive, then a step 1063 pushes the operator into an array that stores the necessary information about the relation between the operator and the flow that is being analyzed. Once the information is pushed into the array, the counters for the array elements and the operator counter are incremented. If the step 1062 is negative, then a step 1065 increments the operator counter. If all the operators have been evaluated step 1061 is negative and passes to a step 1066 where the score variable for operators between the cutoff and addition thresholds is assigned the counter variable. Step 1066 is followed by a step 1067 increments the counter and a continuation step 1068 returns the flow to step 1042.

Figure 15:
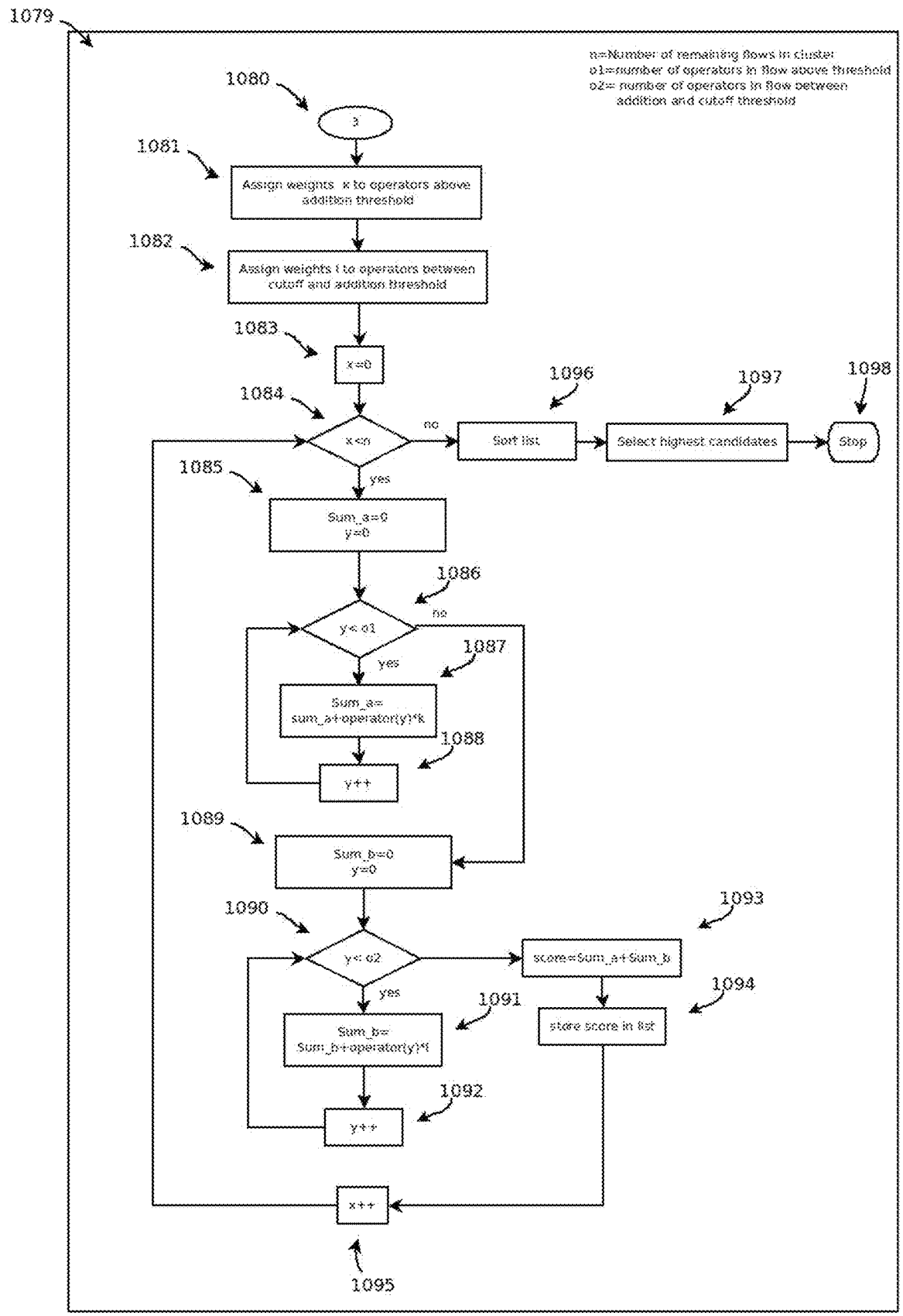
FIG. 15 presents the selection process of the candidate flow that is representative of the cluster.

FIG. 15 presents the selection process of the candidate flow that is representative of the cluster. A process 1079 has a step 1080 that is the negative outcome of step 1042 where an iteration over all flows in the cluster is concluded. Step 1080 paves way for a step 1081 where an assignment of weights is given to the operators above the addition threshold. This weight assignment can be done based on the nature of the operator such as doing data extraction, or other particular well-known process. Alternatively, it can be by individual operator ID 52 or operation ID 58. A step 1082 does an assignment of weights given to the operators between the addition and cutoff threshold in a similar way to step 1081. Once step 1081 and step 1082 is done a step 1083 sets the flow counter to zero. A step 1084 starts the iteration through the initialized counter of step 1083 compared against a count of unique flow entries in both arrays. If the comparison of the counter is below the count of unique entries, then the iteration continues to a step 1085. The step 1085 sets to zero the counter for the total sum of above the addition threshold sum and sets the counter of entries to zero. A step 1086 follows step 1085 and makes a loop that goes through all elements above the threshold for that particular flow. The loop 1086 contains a step 1087 that consists of a summation that accumulates the sum in addition to the number of operators times the weight and a step 1087 where the counter is increased and returns to step 1086. Once all elements of the array are summed up with their corresponding weight multiplied, the condition of step 1086 turns negative and a step 1089 follows. Step 1089 sets a second summation accumulator variable for the in between the addition and cutoff sum and a counter variable. A step 1090 starts the evaluation of variables that serve as iteration. If the counter for the array of in between the addition and cutoff is less than the total amount of elements of the array, then the decision evaluates to true. The iteration bound by the decision step 1090 contains a step 1091 that consists of a summation that accumulates the sum in addition to the number of operators times the weight and a step 1092 where the counter is increased and returns to step 1090. Once all elements of the array are summed up with their corresponding weight multiplied, the condition of step 1090 turns negative and a step 1093 follows. The step 1093 calculates the score for the particular flow by summing both the addition and the in between addition and cutoff scores. The score of step 1093 is then stored in an array in a step 1094. Step 1094 is followed by an increase of the flow counter in a step 1095. When all flows are evaluated the condition of step 1084 evaluates to negative and the loop terminates. Once the loop terminates, a step 1096 sorts the results from highest to lowest and a step 1097 selects the first element form the list which represents the highest score. This selection will be the default flow that will be presented to the user for evaluation.

Figure 16:
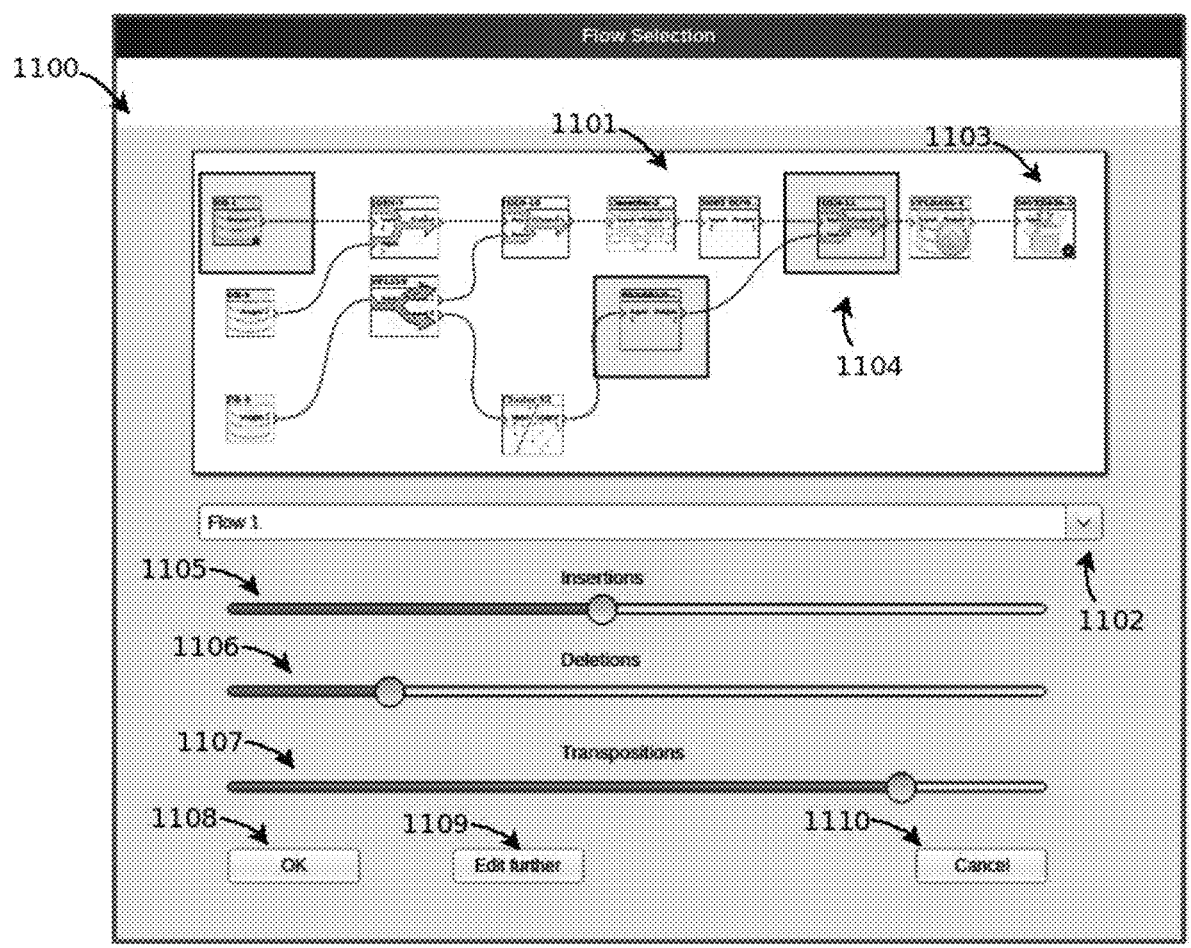
FIG. 16 shows the user interface that will present the candidate flow representative of the cluster.

FIG. 16 shows the user interface that will present the candidate flow representative of the cluster. A user interface 1100 consists of a canvas 1101 that shows the selected flow from the process of FIG. 15. A drop-down menu 1102 will allow the user to clear the canvas and display other flows in the sorted list from step 1096. The canvas 1101 that displays the selected flow will contain an operator 1103 that the user has not selected to remain unchanged. An operator 1104 has been chosen by the user as a core operator that will not be subject to further modification. The square represents a possible graphical display of the operator 1104. A slider 1105 will allow insertions that were discarded from the flow presented in canvas 1101. A slider 1106 will allow deletions from the flow presented in canvas 1101 base on their score of the operator in the flow. A slider 1107 will allow the user to do transpositions of pairs or triples of operators that appear on multiple flows in the cluster. The mention of pairs or triples should not be limiting to implementing alternate embodiments that might consider bigger sequences. A button 1108 implements an acceptance of the canvas for the user while a button 1109 will free the canvas for manual manipulation and a button 1110 will cancel the analysis carried out on the user interface.

What is claimed is:

1. A computer-implemented method for validation, optimization, and selection of a computer process execution workflow, comprising a plurality of operators with specified characteristics, wherein said workflow is a candidate representative of a workflow set wherein each workflow of said workflow set comprises a plurality of operators, comprising the steps of:

receiving, using a computing device, a workflow set obtained from the clustering operation implemented by a flow classification system;

calculating, using a computing device, a number of instances for each different operator in said plurality of operators in each workflow of said workflow set;

creating, using a computing device, a histogram based on each different operator in said plurality of operators in all the workflows of said workflow set;

establishing, using a computing device, an operator cutoff threshold and an operator addition threshold based on a maximum number of operators for each different operator obtained from said histogram;

eliminating, using a computing device, all instances of each operator from said plurality of operators wherein the number of operators for each different operator in the histogram is below said operator cutoff threshold;

creating, using a computing device, a provisional operator set that includes each operator from said plurality of operators wherein the number of operators for each different operator in the histogram is above said operator cutoff threshold and below said operator addition variable;

creating, using a computing device, a critical operator set that includes each operator from said plurality of operators wherein the number of operators for each different operator in the histogram is above said operator addition threshold;

assigning, using a computing device, an addition score to each workflow from said workflow set that contains at least one operator from said critical operator set, wherein said addition score is based on the total amount of operators in each workflow;

assigning, using a computing device, a provisional score to each workflow from said workflow set that contains at least one operator from said provisional operator set, wherein said provisional score is based on the total amount of operators in each workflow;

assigning, using a computing device, an addition weight to each operator in said critical operator set;

assigning a provisional weight to each operator in said provisional operator set;

calculating, using a computing device, a workflow score for each workflow from said workflow set that contains at least one operator from said critical operator set and contains at least one operator from said provisional operator set, wherein said workflow score is based on said addition weight, said provisional weight and the amount of operators in each workflow;

selecting, using a computing device, a candidate workflow from said workflow set, wherein said candidate workflow contains the highest workflow score from said workflow set;

wherein each operator comprises particular hardware configuration parameters indicating the processing type and execution type of the operator;

wherein said processing type can be single process or multi-core execution, and said execution type can be in-memory execution or on-disk execution;

wherein said operators execute on data with particular data attributes;

wherein said data attributes comprise the data type, data size and particular patterns of the data;

wherein said data size is the number of characters of a string or the precision of a double precision number;

wherein particular algorithms with different complexities are implemented in the operators;

creating, through an exemplary system, an execution program that is specified by a functionality icon within the candidate workflow that contains the configuration of operators that will be executed by the exemplary system;

sending the execution program to an execution manager that produces an execution map based on the execution program;

sending the execution program to a controller that coordinates with an execution engine and an execution engine coordinator, wherein said execution engine coordinator uses a hardware selector for selecting processing technology and uses a hardware optimizer for coordinating with the hardware software module that contains necessary routine for interacting with the hardware associated to the selected processing technology.

2. The method as in claim 1, wherein creating said provisional operator set comprises creating, using a computing device via said computer-implemented system, an operator array that includes every operator from said provisional operator set that is present in each workflow of said workflow set.

3. The method as in claim 2, wherein said operator array is a multidimensional array comprising a plurality of variables.

4. The method as in claim 1, wherein creating said critical operator set comprises creating, using a computing device via said computer-implemented system, an operator array that includes every operator from said critical operator set that is present in each workflow of said workflow set.

5. The method as in claim 4, wherein said operator array is a multidimensional array comprising a plurality of variables.

6. The method as in claim 1, wherein assigning an addition weight is based on the nature of the operator.

7. The method as in claim 1, wherein assigning a provisional weight is based on the nature of the operator.

8. The method as in claim 1, further comprising the step of displaying using a computing device via said computer-implemented system, said candidate workflow in a user interface.

9. The method as in claim 8, wherein said user interface allows for manually modifying said candidate workflow.

10. A computer-implemented system for validation, optimization, and selection of a computer process execution workflow comprising a plurality of operators with specified characteristics, wherein said workflow is a candidate representative of a workflow set wherein each workflow of said workflow set comprises a plurality of operators, comprising:
   one or more computer processors;
   one or more computer readable storage devices;
   program instructions stored on said one or more computer readable storage devices for execution by at least one of said one or more computer processors, said stored program instructions comprising:
      receiving, using a computing device, a workflow set obtained from the clustering operation implemented by a flow classification system;
      program instructions for calculating, using a computing device, a number of instances for each different operator in said plurality of operators in each workflow of said workflow set;
      program instructions for creating, using a computing device, a histogram based on each different operator in said plurality of operators in all the workflows of said workflow set;
      program instructions for establishing, using a computing device, an operator cutoff threshold and an operator addition threshold based on a maximum number of operators for each different operator obtained from said histogram;
      program instructions for eliminating, using a computing device, all instances of each operator from said plurality of operators wherein the number of operators for each different operator in the histogram is below said operator cutoff threshold;
      program instructions for creating, using a computing device, a provisional operator set that includes each operator from said plurality of operators wherein the number of operators for each different operator in the histogram is above said operator cutoff threshold and below said operator addition variable;
      program instructions for creating, using a computing device, a critical operator set that includes each operator from said plurality of operators wherein the number of operators for each different operator in the histogram is above said operator addition threshold;
      program instructions for assigning, using a computing device, an addition score to each workflow from said workflow set that contains at least one operator from said critical operator set, wherein said addition score is based on the total amount of operators in each workflow;
      program instructions for assigning, using a computing device, a provisional score to each workflow from said workflow set that contains at least one operator from said provisional operator set, wherein said provisional score is based on the total amount of operators in each workflow;
      program instructions for assigning, using a computing device, an addition weight to each operator in said critical operator set;
      program instructions for assigning, using a computing device, a provisional weight to each operator in said provisional operator set;
      program instructions for calculating, using a computing device, a workflow score for each workflow from said workflow set that contains at least one operator from said critical operator set and contains at least one operator from said provisional operator set, wherein said workflow score is based on said addition weight, said provisional weight and the amount of operators in each workflow;
      program instructions for selecting, using a computing device, a candidate workflow from said workflow set, wherein said candidate workflow contains the highest workflow score from said workflow set;
   wherein each operator comprises particular hardware configuration parameters indicating the processing type and execution type of the operator;
   wherein said processing type can be single process or multi-core execution, and said execution type can be in-memory execution or on-disk execution;
   wherein said operators execute on data with particular data attributes;
   wherein said data attributes comprise the data type, data size and particular patterns of the data;
   wherein said data size is the number of characters of a string or the precision of a double precision number;
   wherein particular algorithms with different complexities are implemented in the operators;
   program instructions for creating, through an exemplary system, an execution program that is specified by a functionality icon within the candidate workflow that contains the configuration of operators that will be executed by the exemplary system;
   program instructions for sending the execution program to an execution manager that produces an execution map based on the execution program;
   program instructions for sending the execution program to a controller that coordinates with an execution engine and an execution engine coordinator, wherein said execution engine coordinator uses a hardware selector for selecting processing technology and uses a hardware optimizer for coordinating with the hardware software module that contains necessary routine for interacting with the hardware associated to the selected processing technology.

11. The system as in claim 10, wherein creating said provisional operator set comprises creating, using a computing device via said computer-implemented system, an operator array that includes every operator from said provisional operator set that is present in each workflow of said workflow set.

12. The system as in claim 11, wherein said operator array is a multidimensional array comprising a plurality of variables.

13. The system as in claim 10, wherein creating said critical operator set comprises creating, using a computing device via said computer-implemented system, an operator array that includes every operator from said critical operator set that is present in each workflow of said workflow set.

14. The system as in claim 13, wherein said operator array is a multidimensional array comprising a plurality of variables.

15. The system as in claim 10, wherein assigning an addition weight is based on the nature of the operator.

16. The system as in claim 10, wherein assigning a provisional weight is based on the nature of the operator.

17. The system as in claim 10, further comprising instructions for displaying, using a computing device via said computer-implemented system, said candidate workflow in a user interface.

18. The system as in claim 17, wherein said user interface allows for manually modifying said candidate workflow.

* * * * *